United States Patent
Klabukov et al.

(10) Patent No.: US 10,121,372 B2
(45) Date of Patent: Nov. 6, 2018

(54) METHOD AND SYSTEM FOR DISPLAYING SPEED INFORMATION

(71) Applicant: OBSHCHESTVO S OGRANICHENNOJ OTVETSTVENNOSTYU "RIT INNOVACII", Izhevsk (RU)

(72) Inventors: Ivan Anatolevich Klabukov, Izhevsk (RU); Aleksei Anatolevich Ostanin, Iyulskoye village (RU); Mihail Vladimirovich Sannikov, Izhevsk (RU)

(73) Assignee: RIT INNOVATIONS, LLC, Izhevsk (RU)

( * ) Notice: Subject to any disclaimer, the term of this patent is extended or adjusted under 35 U.S.C. 154(b) by 0 days.

(21) Appl. No.: 15/563,719

(22) PCT Filed: Apr. 18, 2016

(86) PCT No.: PCT/RU2016/000220
§ 371 (c)(1),
(2) Date: Oct. 2, 2017

(87) PCT Pub. No.: WO2017/184007
PCT Pub. Date: Oct. 26, 2017

(65) Prior Publication Data
US 2018/0204454 A1    Jul. 19, 2018

(51) Int. Cl.
*G08G 1/09*        (2006.01)
*G08G 1/0962*    (2006.01)
(Continued)

(52) U.S. Cl.
CPC ..... *G08G 1/09626* (2013.01); *G01C 21/3697* (2013.01); *G06F 3/04847* (2013.01);
(Continued)

(58) Field of Classification Search
CPC .............. B60K 31/185; G01C 21/3697; G01C 21/3655; A63F 13/10; G02B 27/0101; G06F 3/013
(Continued)

(56) References Cited

U.S. PATENT DOCUMENTS 7,589,643 B2 *   9/2009   Dagci ................... B60K 31/185
                                                           340/441
8,364,392 B2 *   1/2013   Chao ................... G01C 21/3697
                                                           340/441
(Continued)

FOREIGN PATENT DOCUMENTS

DE            19906419 A1      8/2000

OTHER PUBLICATIONS

Garmin. Rukovodstvo polzovatelya nuvi serii 2407/2408/2507/2508, Nov. 2014.

*Primary Examiner* — Hoi Lau
(74) *Attorney, Agent, or Firm* — Georgiy L. Khayet

(57) ABSTRACT

A system for displaying speed information for a vehicle includes a speed measuring device configured to obtain an actual current speed, a display for displaying speed information to an operator, and a controller. The controller acquires a geographical location, obtains road data including a posted speed limit for the geographical location, and causes displaying a first graphical feature indicating the posted speed limit and a second graphical feature indicating the actual current speed. For example, the first graphical feature is in the form of a ring, while the second graphical feature is a circle centered within the first graphical feature. A size of the second graphical feature corresponds to the actual current speed and dynamically changes with the change of the actual current speed. Thus, the size of second graphical feature increases with the increase of actual cur-
(Continued)

rent speed and decreases with the decrease of actual current speed.

16 Claims, 8 Drawing Sheets

(51) Int. Cl.
G01C 21/36 (2006.01)
H04L 29/08 (2006.01)
G08G 1/0967 (2006.01)
H04W 4/02 (2018.01)
H04W 4/48 (2018.01)
G06F 3/0484 (2013.01)

(52) U.S. Cl.
CPC . *G08G 1/096716* (2013.01); *G08G 1/096758* (2013.01); *G08G 1/096775* (2013.01); *H04L 67/36* (2013.01); *H04W 4/027* (2013.01); *H04W 4/48* (2018.02)

(58) Field of Classification Search
USPC .... 701/1, 408, 532, 538, 301; 340/438, 441, 340/905
See application file for complete search history.

(56) References Cited

U.S. PATENT DOCUMENTS

| | | | |
|---|---|---|---|
| 2005/0154505 A1* | 7/2005 | Nakamura | G01C 21/365 701/1 |
| 2007/0001830 A1* | 1/2007 | Dagci | B60K 31/185 340/438 |
| 2011/0059783 A1* | 3/2011 | Tipping | A63F 13/10 463/6 |
| 2011/0088744 A1* | 4/2011 | Xia | H02S 50/10 136/244 |
| 2011/0161004 A1* | 6/2011 | Chao | G01C 21/3697 701/408 |
| 2011/0288770 A1* | 11/2011 | Greasby | G01C 21/3697 701/532 |
| 2013/0188259 A1* | 7/2013 | Nakamura | G02B 27/0101 359/630 |
| 2014/0114575 A1* | 4/2014 | Alders | G01C 21/3655 701/538 |
| 2015/0260522 A1* | 9/2015 | Lei | G01C 21/3697 701/408 |
| 2016/0103217 A1* | 4/2016 | Samuthirapandian | G01S 7/22 701/301 |
| 2017/0187963 A1* | 6/2017 | Lee | G06F 3/013 |

* cited by examiner

Speed = 0 mph

Speed = 30 mph

Speed = 60 mph

Speed > 60 mph

METHOD AND SYSTEM FOR DISPLAYING SPEED INFORMATION

TECHNICAL FIELD

This disclosure generally relates to speedometers and systems for displaying vehicle speed information. More particularly, this disclosure relates to methods and systems for displaying actual current speed of a vehicle and a posted speed limit, where the actual current speed is represented by a graphical feature having size (e.g., a diameter) varying with the change of the actual current speed.

DESCRIPTION OF RELATED ART

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Today, most vehicles include speedometers that measure and display the instantaneous speed of a vehicle. The speedometers can be of mechanical and electronic nature and generally indicate a value associated with the actual current speed. Typically, the speedometers display a scale and a pointer, which moves along the scale in accordance with the change of instantaneous vehicle speed.

Unfortunately, the use of conventional speedometers is distracting and not safe for the drivers. On average, a routine check of the speedometer takes about two seconds, which causes the driver to get distracted for approximately 300 feet out of every mile of a highway. Thus, new approaches for displaying speed information to the drivers are needed to reduce distraction and improve road safety.

SUMMARY

This section is provided to introduce a selection of concepts in a simplified form that are further described below in the Detailed Description section. This summary is not intended to identify key features or essential features of the claimed subject matter, nor is it intended to be used as an aid in determining the scope of the claimed subject matter.

According to one aspect of this disclosure, there is provided a method for displaying speed information. The method comprises the steps of acquiring a current geographical location of a portable electronic device or a vehicle, obtaining road data for the current geographical location of the portable electronic device or the vehicle, and determining an actual current speed of the portable electronic device or the vehicle. The road data includes a posted speed limit and optionally other information such as traffic signs, road safety information, and so forth. The method further includes the steps of displaying a first graphical feature indicating the posted speed limit and displaying a second graphical feature indicating the actual current speed of the portable electronic device or the vehicle. The second graphical feature has a size that corresponds to the actual current speed such that the size of the second graphical feature is increased with the increase of the actual current speed. Similarly, the size of the second graphical feature is decreased with the decrease of the actual current speed.

The first graphical feature can have a representation of a graphical feature such as a circle, ring, ellipse, square, rectangle, triangle, and the like. In some embodiments, the first graphical feature is depicted in the form of a contour of circle, ring, ellipse, square, rectangle, triangle, or another geometrical object. The second graphical feature can have a representation of a circle, ellipse, square, rectangle, triangle, and so forth. The second graphical feature can be centered with the circular graphical feature such that the second graphical feature is located substantially inside the circular graphical feature. The size of the second graphical feature substantially reaches a size of the circular graphical feature when the actual current speed reaches the posted speed limit. Further, the method includes increasing the size of the second graphical feature greater than the size of the circular graphical feature when the actual current speed increases and is greater than the posted speed limit. Moreover, in some embodiments, the second graphical feature can be a first color, and the second graphical feature becomes a second color when the actual current speed reaches the posted speed limit (the second color substantially differs from the first color).

In yet additional embodiments, the method further comprises the step of displaying a first symbol indicating the posted speed limit, where the first symbol provides a numerical value of the posted speed limit. The method can also comprise the step of displaying a second symbol indicating the actual current speed, where the second symbol provides a numerical value of the actual current speed. In yet another embodiment, the method can comprise the step of displaying a third graphical feature indicating a road type, wherein the road type is retrieved from the road data. In some embodiments, the method includes providing a graphical user interface to enable an operator to set a tolerance value associated with the posted speed limit and increasing the posted speed limit by the tolerance value.

According to another aspect of this disclosure, there is provided an in-vehicle system for displaying speed information. The system comprises a speed measuring device configured to measure an actual current speed of a vehicle, a display for displaying speed information to an operator of the vehicle, and a controller. The controller is configured to: acquire a current geographical location of the vehicle, obtain road data for the current geographical location of the portable electronic device or the vehicle (the road data includes a posted speed limit), and cause the display to display a first graphical feature indicating the posted speed limit, and a second graphical feature indicating the actual current speed of the portable electronic device or the vehicle. The second graphical feature has a size that corresponds to the actual current speed. The controller is further configured to increase the size of the second graphical feature with the increase of the actual current speed and decrease the size of the second graphical feature with the decrease of the actual current speed.

The current geographical location can be acquired from a satellite navigation system or a portable electronic device (e.g., mobile device). The road data for the current geographical location can be acquired from a server, satellite navigation system, portable electronic device, or a memory associated with the controller.

In certain embodiments, the first graphical feature includes a circular graphical feature such as a ring or hollow rectangle. The second graphical feature is centered with the circular graphical feature such that the second graphical feature is located substantially inside the circular graphical feature. The size of the second graphical feature substantially reaches a size of the circular graphical feature when the actual current speed is about the posted speed limit. The controller is also configured to increase the size of the second graphical feature greater than the size of the circular graphical feature when the actual current speed increases and is greater than the posted speed limit. The controller can also be configured to cause the display to display a first symbol indicating the posted speed limit, where the first symbol provides a numerical value of the posted speed limit, display a second symbol indicating the actual current speed, where the second symbol provides a numerical value of the actual current speed, and display a third graphical feature indicating a road type, where the road type is retrieved from the road data.

The system can further include a user interface to enable the operator of the vehicle to set a tolerance value associated with the posted speed limit. The controller can be configured to increase the posted speed limit by the tolerance value.

In yet another aspect of this disclosure, there is provided a non-transitory processor-readable medium having instructions stored thereon. When the instructions are executed by one or more processors, the instructions cause the one or more processors to implement a method for displaying speed information, with the method comprising the steps of: acquiring a current geographical location of a portable electronic device or a vehicle, obtaining road data for the current geographical location of the portable electronic device or the vehicle (where the road data includes a posted speed limit), displaying a first graphical feature indicating the posted speed limit, determining an actual current speed of the portable electronic device or the vehicle, displaying a second graphical feature indicating the actual current speed of the portable electronic device or the vehicle, where the second graphical feature has a size that corresponds to the actual current speed, increasing the size of the second graphical feature with the increase of the actual current speed, and decreasing the size of the second graphical feature with the decrease of the actual current speed.

Additional objects, advantages, and novel features of the examples will be set forth in part in the description which follows, and in part will become apparent to those skilled in the art upon examination of the following description and the accompanying drawings or may be learned by production or operation of the examples. The objects and advantages of the concepts may be realized and attained by means of the methodologies, instrumentalities and combinations particularly pointed out in the appended claims.

BRIEF DESCRIPTION OF THE DRAWINGS

Embodiments are illustrated by way of example and not limitation in the figures of the accompanying drawings, in which like references indicate similar elements and in which.

DETAILED DESCRIPTION OF EXAMPLE EMBODIMENTS

Figure 1:
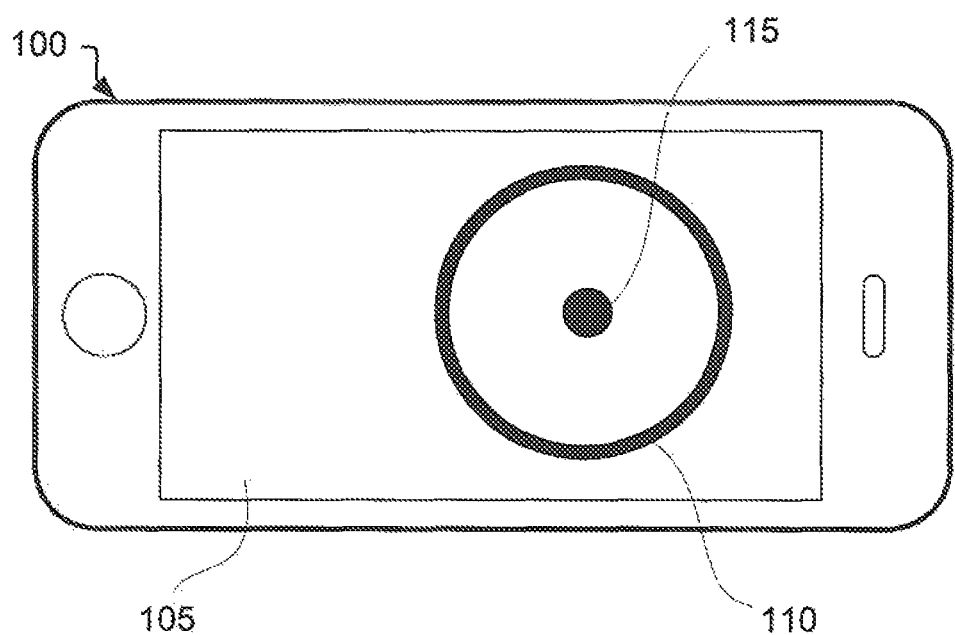
FIG. 1 shows a portable electronic device with a display for showing an actual current speed and a posted speed limit.

The following detailed description of embodiments includes references to the accompanying drawings, which form a part of the detailed description. Approaches described in this section are not prior art to the claims and are not admitted to be prior art by inclusion in this section. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical and operational changes can be made without departing from the scope of what is claimed. The following detailed description is, therefore, not to be taken in a limiting sense, and the scope is defined by the appended claims and their equivalents.

Present teachings may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a transitory or non-transitory storage medium such as a disk drive or computer-readable medium. It should be noted that methods disclosed herein can be implemented by a computer (e.g., a desktop computer, tablet computer, laptop computer), portable electronic device (e.g., cellular phone, smart phone, personal digital assistant), navigation system, in-vehicle controller, and so forth.

The present teachings relate to methods and systems for displaying speed information with minimized distraction that enhances safe driving. In general, the methods can be implemented on a portable electronic device (such as a smart phone, cellular phone, tablet computer, and vehicle navigation system) or an in-vehicle speedometer. In some embodiments, head-up display can be also used for performing the method of present teachings.

According to embodiments of this disclosure, the method includes determining an actual current speed or velocity. The actual current speed can be determined by reading a speed measuring device installed in a vehicle. Alternatively, the actual current speed can be obtained from a navigation system or navigator. In yet another example, the actual current speed can be obtained from or by a portable electronic device. In some examples, the actual current speed is received from a server. The actual current speed can be determined repeatedly, for example, every microsecond, millisecond, second, and so forth. Thus, the actual current speed can represent a speed of moving vehicle, a speed of a portable electronic device, or both.

The present method for displaying speed information further determines a current geographical location. This information can be obtained from a vehicle navigation system, a navigation system of portable electronic device, and the like. For example, the portable electronic device can use localization feature such as mobile positioning service including network-based localization methods, handset-based localization methods, SIM-based localization methods, wireless radio based localization methods, hybrid positioning methods, and the like. In other examples, the portable electronic device can make readings of the current geographical location using vehicle navigation systems such as a Global Positioning System (GPS) receiver, GLONASS receiver, Galileo receiver, and so forth.

Further, road data is obtained from a memory of an in-vehicle controller, a memory of a portable electronic device, a server, a navigation system, or the like. The road data can be inquired for a current geographical location determined by the vehicle or portable electronic device as explained above. Accordingly, the road data can be inquired and received repeatedly. For example, the road data can be acquired each millisecond, second, minute, and so forth. Alternatively, the road data is acquired when the current geographical location changes in a predetermined manner. For example, the road data is acquired when a difference between the current geographical location and a location, when the road data was acquired last time, becomes more than a predetermined value (e.g., one foot, ten feet, one hundred feet, one mile, two miles, etc.).

The road data includes a posted speed limit relevant to the current geographical location. The posted speed limit can indicate a maximum allowed speed on a particular road or area as stipulated by federal or local government regulations. For example, the posted speed limit can be 25 miles per hour, 40 miles per hour, 55 miles per hour, 65 miles per hour, and the like. The road data, however, can include additional information. For example, in some embodiments, the road data can further include a road type with a current geographical location. The road types may include a wide range of roads including a highway, freeway, expressway, autobahn, parkway, driveway, in-city road, street, and so forth. In yet more embodiments, the road data can further include traffic signs or road signs associated with a current geographical location. The traffic signs can include danger warning signs, priority signs, prohibitory signs, mandatory signs, special regulation signs, marker signs, guide and information signs, recreational signs, and so forth. In some additional embodiments, the road data can further include navigation information, routes, directions, real-time traffic information, and so forth.

The present method for displaying speed information further displays the obtained information in a particular manner as explained below. The displaying can be performed on a display of the portable electronic device, a display of a navigation system, an in-vehicle speedometer display, or a vehicle dashboard display. More specifically, a first graphical feature is displayed indicating the posted speed limit. The first graphical feature can be a ring or any other circular object such as a hollow rectangle or the like. There is also displayed a second graphical feature indicating the actual current speed as determined or measured. The second graphical feature can be shown as a circle or rectangle, and has a size that substantially corresponds to the actual current speed and dynamically changes with the change of the actual current speed. Thus, the size of the second graphical feature increases with the increase of the actual current speed, and the size of the second graphical feature decreases with the decrease of the actual current speed. When the actual current speed reaches the posted speed limit (or any other predetermined value), the size of the second graphical feature increases and reaches a size of the first graphical feature indicating thereby to an operator that he or the vehicle reached a maximum allowed speed. At that instant, a color of the second graphical feature can change to provide additional visual signal to the operator. In some embodiments, additional visual effects, such as blinking or a video clip, can be provided at the time when the actual current speed reaches the posted speed limit. If the actual current speed still increases above the posted speed limit, the size of the second graphical feature increases up to a predetermined limit (however, a rate of increasing the size of the second graphical feature can be slower when the actual current speed is smaller than the posted speed limit).

Thus, the visual indication of the actual current speed according to present teachings does not require the operator to read an actual current speed numerical value and mentally compare it to the posted speed limit. This makes it less distracting for the operator and yet easier to apprehend. Thus, the present teachings were found to provide greater road safety.

It should be understood that varying the size of the second graphical feature based on the current speed is just one of the embodiments of this disclosure. Further embodiments may include varying other characteristics of the second graphical feature based on the current speed. For example, in one further embodiment, with the increase of the actual current speed, the second graphical feature can decrease transparency and with the decrease of the actual current speed, the second graphical feature can increase transparency. In yet further embodiment, with the increase of the actual current speed, the second graphical feature can change its shape in a first order (e.g., transform from a circle to a rectangle), and with the decrease of the actual current speed, the second graphical feature can change its shape in a second order opposite to the first order. In yet further embodiments, the changes in size, shape, color, and/or transparency in the second graphical feature can be combined.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to." Additionally, all ranges provided herein include the upper and lower values of the range unless explicitly noted. For example, the term "about" shall mean a reasonable deviation from a value accompanying this term. If it is not specified otherwise, the term "about" may refer to a variation of 10% from an indicated value. In the case of a range of values, the term "about" may refer to a 10% variation from both the lower and upper limits of the range. It should be also understood that the terms "first," "second," "third," and so forth can be used herein to describe various elements. These terms are used to distinguish one element from another, but not to imply a required sequence of elements. For example, a first element can be termed a second element, and, similarly, a second element can be termed a first element, without departing from the scope of present teachings.

Moreover, for purposes of this patent document, the term "head-up display" may also be referred to "head-up display" or simply HUD. The term "operator" shall mean an operator of a vehicle (i.e., a driver), passenger of a vehicle, or a user of a portable electronic device. The term "vehicle" shall mean any device, system, or apparatus for transporting, carrying, or conveying individuals or objects, including automobiles, buses, trucks, vans, sport utility vehicles, trailers, trains, railroad cars, boats, ships, aircrafts, airplanes, helicopters, farm equipment, electric cars, motorcycles, motorbikes, bikes, bicycles, and so forth. The term "portable electronic device" shall mean any portable electronic device with a display or image-projecting device, including a mobile device, cellular phone, mobile phone, smart phone, tablet computer, laptop computer, personal digital assistant, music player, multimedia player, portable computing device, navigation system, GPS navigator, GLONASS navigator, and so forth. The terms "navigation system" and "navigator" shall mean any piece of hardware, software, or combination thereof that can, as at least one of its functions, provide mapping, routing, and/or location information, whether or not it includes GPS or has the ability via a wireless or wired network to access a GPS device.

Further, for purposes of this patent document, the term "data" shall mean information, segments of information, or the raw material of information. Data may take various forms, including, but not limited to, numbers, letters, symbols, text, graphics, images, audio, and/or video and may comprise a single fact or a collection of facts, raw facts, statistical data, metadata, binary digits, measurements, concepts, instructions, commands, codes, animation, databases, database information, links, programs, computer files, computer records, and so forth. For example, data of current geographical location as obtained from a portable electronic device or navigation system may take the form of a location code, geographic identifying information (e.g., coordinate information, all or part of a zip code, post code, a telephone number, or other similar data that can be used to directly or indirectly identify at least one associated geographic location). Road data can include, but is not limited to, a posted speed limit for a particular road or a part thereof, road signs, road conditions, vehicle traffic conditions, and so forth. Similar to above, the road data can take the form of one or more codes, commands, computer files, metadata, database information, and so forth.

Now, exemplary embodiments are described with reference to the accompanying drawings. FIG. 1 shows a portable electronic device 100 with a display 105 for showing an actual current speed and a posted speed limit according to certain embodiments of this disclosure. The portable electronic device 100 can refer to a mobile device, such as a smartphone or tablet computer, or a navigation system. The portable electronic device 100 can have installed a software application, such as mobile application, that enables the portable electronic device 100 to implement the method for displaying speed information according to present teachings.

In this embodiment, the portable electronic device 100 is configured to determine an actual current speed of the portable electronic device 100 by making readings from an internal navigation system, inertial navigation system, motions sensors, and so forth. In some embodiments, the portable electronic device 100 can acquire the actual current speed from a vehicle, a server, or any other hardware device using a radio communication link.

The portable electronic device 100 is also configured to determine a current geographical location of portable electronic device 100. Similarly to above, current geographical location can make readings from an internal navigation system or acquire this data from a vehicle, a server, or any other hardware device using a radio communication link.

By default, a posted speed limit can be predetermined and preset in the software application, for example, to 60 miles per hour (mph). The operator can adjust this setting and provide any other posted speed limit in the software application of the portable electronic device 100.

As shown in FIG. 1, the software application causes the portable electronic device 100 to display on the display 105 a graphical user interface (GUI) showing at least two graphical features 110 and 115. The first graphical feature 110 is associated with a posted speed limit or any other predetermined speed limit (e.g., a limit set by the operator). The second graphical feature 115 is associated with an actual current speed of the portable electronic device 100, a vehicle, or both.

The first graphical feature 110 is shown in the form of a ring, although any other circular or circular-like object can be displayed, including an ellipse, rectangle, square, triangle, rhombus, trapezium, and so forth. Accordingly, the first graphical feature 110 can have a diameter characterizing a posted speed limit or any other predetermined speed limit. The first graphical feature 110 can be of a first color (e.g., green). According to embodiments of this disclosure, the first graphical feature 110 is statically displayed. In other embodiments, however, the first graphical feature 110 can be animated.

The second graphical feature 115 is shown in the form of a circle, although any other circular or circular-like object can be displayed, including an ellipse, rectangle, square, triangle, rhombus, trapezium, and so forth. Thus, the second graphical feature 115 can have a diameter characterizing an actual current speed limit. The second graphical feature 115 can be of a second color. The first and second colors can coincide or differ from each other depending on an application. For example, both colors are green. According to embodiments of this disclosure, the second graphical feature 115 is not statically displayed, but rather it is dynamically changed or animated according to the actual current speed. In an example, the size of the second graphical feature 115 can increase with the increase of the actual current speed. Similarly, the size of the second graphical feature 115 can decrease with the decrease of the actual current speed. Thus, when the size of the second graphical feature 115 reaches the size of the first graphical feature 110, the operator can appreciate that the portable electronic device or vehicle reached the posted speed limit (or any other predetermined speed limit set by the operator). In this disclosure, the term "size" of the first or second graphical feature can refer to a diameter of the first or second graphical feature, respectively, or any other dimensional measure of the first or second graphical feature. In some embodiments, the second graphical feature 115 can also change color, transparency, shape, and design depending on the actual current speed. For example, the second graphical feature 115 can become less transparent with the increase of the current actual speed, and, similarly, the second graphical feature 115 can become more transparent with the decrease of the current actual speed. In yet another example embodiment, the second graphical feature 115 can alter its shape in one predetermined order (e.g., from a circle to a rectangle and then to a triangle) with the increase of the current actual speed. Similarly, the second graphical feature 115 can alter its shape in a reversed order (e.g., from the triangle to the rectangle and then to the circle) with the decrease of the current actual speed. In some embodiments, the above embodiments can be combined. For instance, the second graphical feature 115 can increase in size and become less transparent with the increase of the current actual speed, and, similarly, the second graphical feature 115 can decrease in size and become more transparent with the decrease of the current actual speed.

In some embodiments, the event of reaching the posted speed limit can be additionally visualized. For example, there can be displayed still or motion images, the color of graphical features 110 and 115 can change, the graphical features 110 and 115 can blink, and the like. In yet further embodiments, there can be provided acoustic, audio, sound, or voice message or tone. For example, there can be provided sound effects (e.g., repetitive beeping) such that the sound effects can change with the increase of the current actual speed (e.g., a frequency of beeping can increase), and, similarly the sound effects can change in reverse with the decrease of the current actual speed (e.g., the frequency of beeping decreases).

Figure 2:
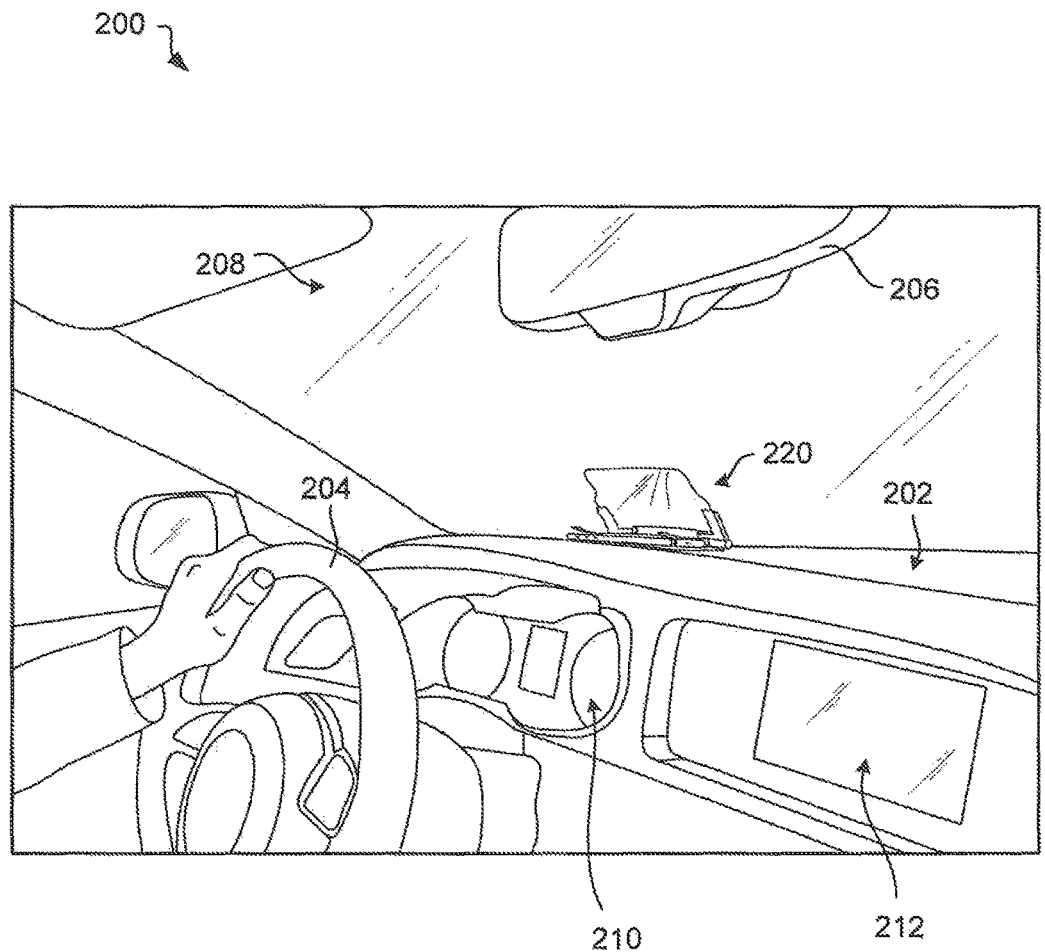
FIG. 2 shows a portion of vehicle interior equipped with a head-up display.

FIG. 2 shows a portion of vehicle interior 200 as viewed from a front passenger seat of a vehicle. Generally, FIG. 2 illustrates a dashboard 202, a steering wheel 204 held by a driver's hand, a rear view mirror 206, a windshield 208, a speedometer display 210, and a display 212 of dashboard 202. According to some example embodiments, the method for displaying speed information of present teachings can be implemented by an in-vehicle controller, and speed information can be displayed on any of the in-vehicle displays such as the speedometer display 210 or dashboard display 212.

In yet other embodiments, the method for displaying speed information of present teachings can be implemented by a head-up display 220. The head-up display 220 can be built-in, mounted, placed, coupled, or connected to the dashboard 202 substantially in front of a driver. The head-up display 220 can include a combiner, which is partially transparent and allows the driver to view both graphical information provided, for example, from a portable electronic device 100, such as a smart phone, and the usual driver's viewpoints such as the road ahead. The combiner allows presenting speed information to the driver without requiring the driver to look away from the road. According to exemplary embodiments of this disclosure, the head-up display 200 includes a cradle assembly for supporting a portable electronic device and a stand assembly for mounting on a dashboard or console of a vehicle. The cradle assembly can be releasably connected to the stand assembly using one or more couplers such as magnetic couplers. Moreover, the stand assembly can be configured to hinge, incline, or rotate the cradle assembly, thereby allowing the driver to adjust the position of the head-up display for greater convenience. The combiner is hinged or otherwise rotatably connected to the cradle assembly. Accordingly, the driver can adjust the position of the combiner and select a convenient position enabling the driver to read the images reflected by the combiner and see the road ahead. These adjusting capabilities enable the driver to accommodate the head-up display for a wide range of vehicles. When the head-up display 220 is used, the software application of portable electronic device 100 can be configured to display mirrored speed information as explained above so that the driver can perceive the displayable speed information in a non-mirrored manner after it is reflected from the combiner.

Figure 3:
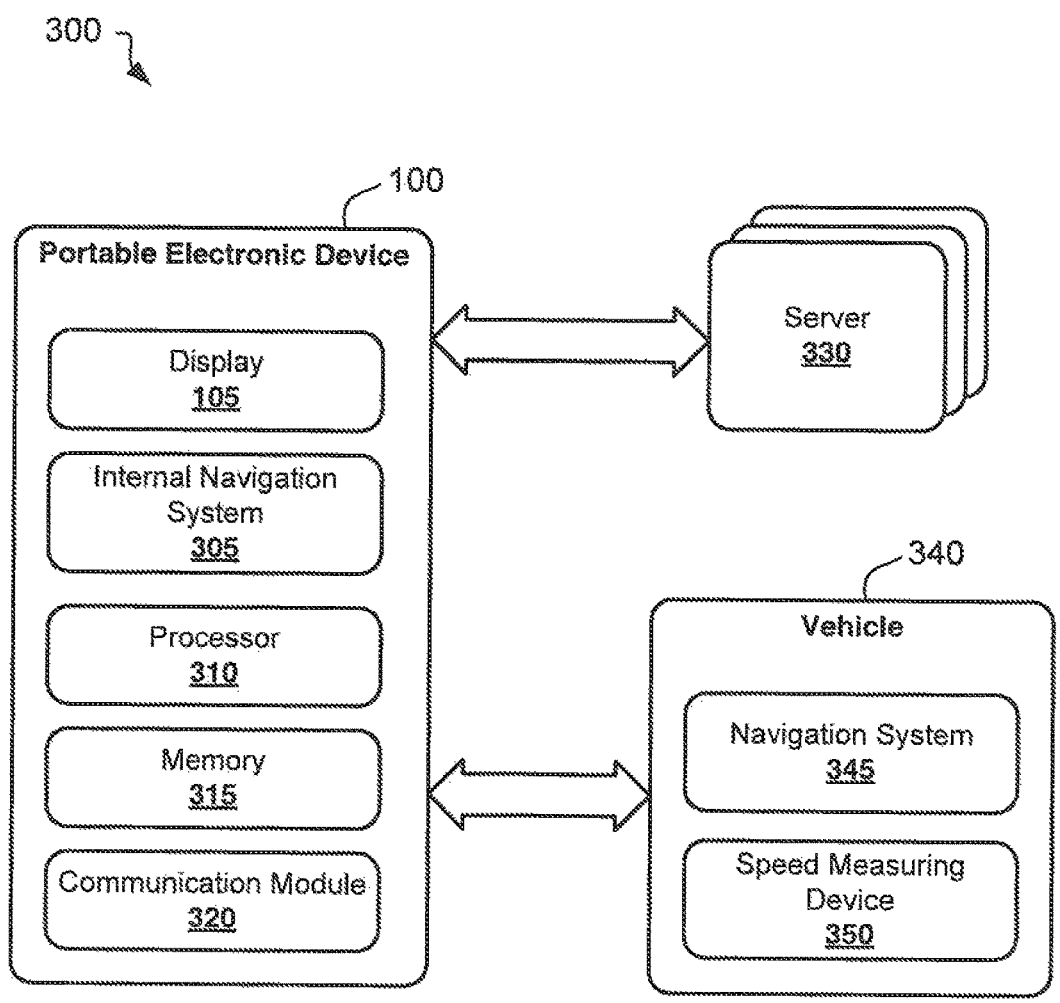
FIG. 3 shows a computer environment for practicing the method for displaying speed information according to one embodiment.

FIG. 3 shows example computer environment 300 for practicing the method for displaying speed information, according to one embodiment of this disclosure. The environment 300 includes a portable electronic device 100 with a display 105 for displaying speed information. The portable electronic device 100 can include an internal navigation system 305 for obtaining geographical location data and/or actual current speed data. The portable electronic device 100 also includes a processor 310 and memory 315 for storing processor-executable codes (e.g., the software application discussed above) for implementing the method for displaying speed information according to embodiments of this disclosure. Memory 315 can also store predetermined settings (e.g., a tolerance value, speed limits, etc.), road data, maps, navigational data, and so forth. The portable electronic device 100 further includes a communication module 320 for wireless communication with one or more servers 330 and optionally with a vehicle 340. For example, the portable electronic device 100 can wirelessly acquire from one of the servers 330 road data, posted speed limits, current geographical location, actual current speed, and so forth. In some embodiments, the portable electronic device 100 can wirelessly acquire from the vehicle 340 (e.g., from an in-vehicle controller) a current geographical location of the vehicle or an actual current speed of the vehicle. For these ends, the vehicle can include a navigation system 345 and/or speed measuring device 350 (e.g., a speedometer).

Figure 4:
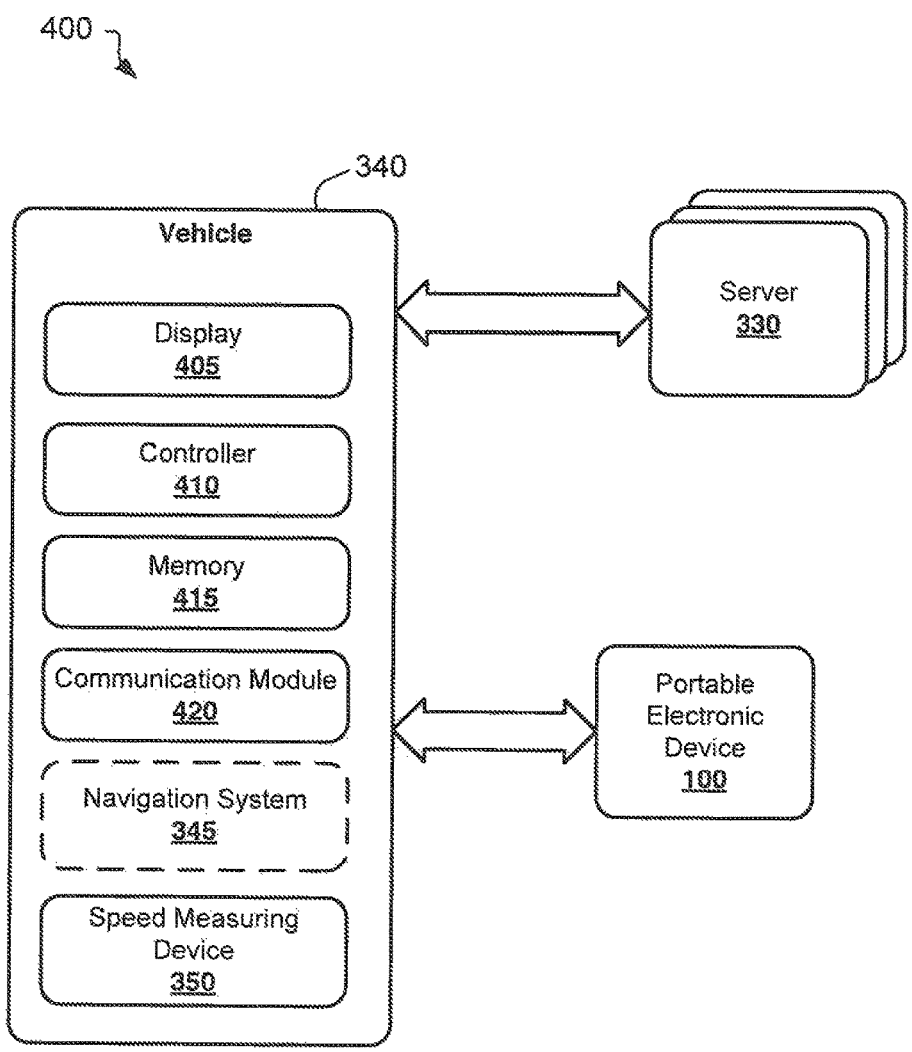
FIG. 4 shows a computer environment for practicing the method for displaying speed information, according to another embodiment.

FIG. 4 shows another example computer environment 400 for practicing the method for displaying speed information. Generally, the environment 400 shows a vehicle 340 having a display 405 (such as the display 210 or display 212). The vehicle 340 also includes an in-vehicle controller 410 and memory 415 for storing processor-executable codes (e.g., the software application as discussed above) for implementing the method for displaying speed information according to embodiments of this disclosure. Memory 415 can also store predetermined settings (e.g., a tolerance value, speed limits, etc.), road data, maps, navigational data, and so forth.

The vehicle 340 further includes a communication module 420 for wireless communication with one or more servers 330 and optionally with a portable electronic device 100. For example, the vehicle 340 can wirelessly acquire from one of the servers 330 road data, posted speed limits, current geographical location, actual current speed, and so forth. In some embodiments, the vehicle 340 can wirelessly acquire from the portable electronic device 100 a current geographical location of the vehicle or an actual current speed of the vehicle. The vehicle 340 also includes a speed measuring device 350 (e.g., a speedometer). The vehicle 340 can optionally include an internal navigation system 345 for obtaining geographical location data and/or actual current speed data of the vehicle.

Figure 5:
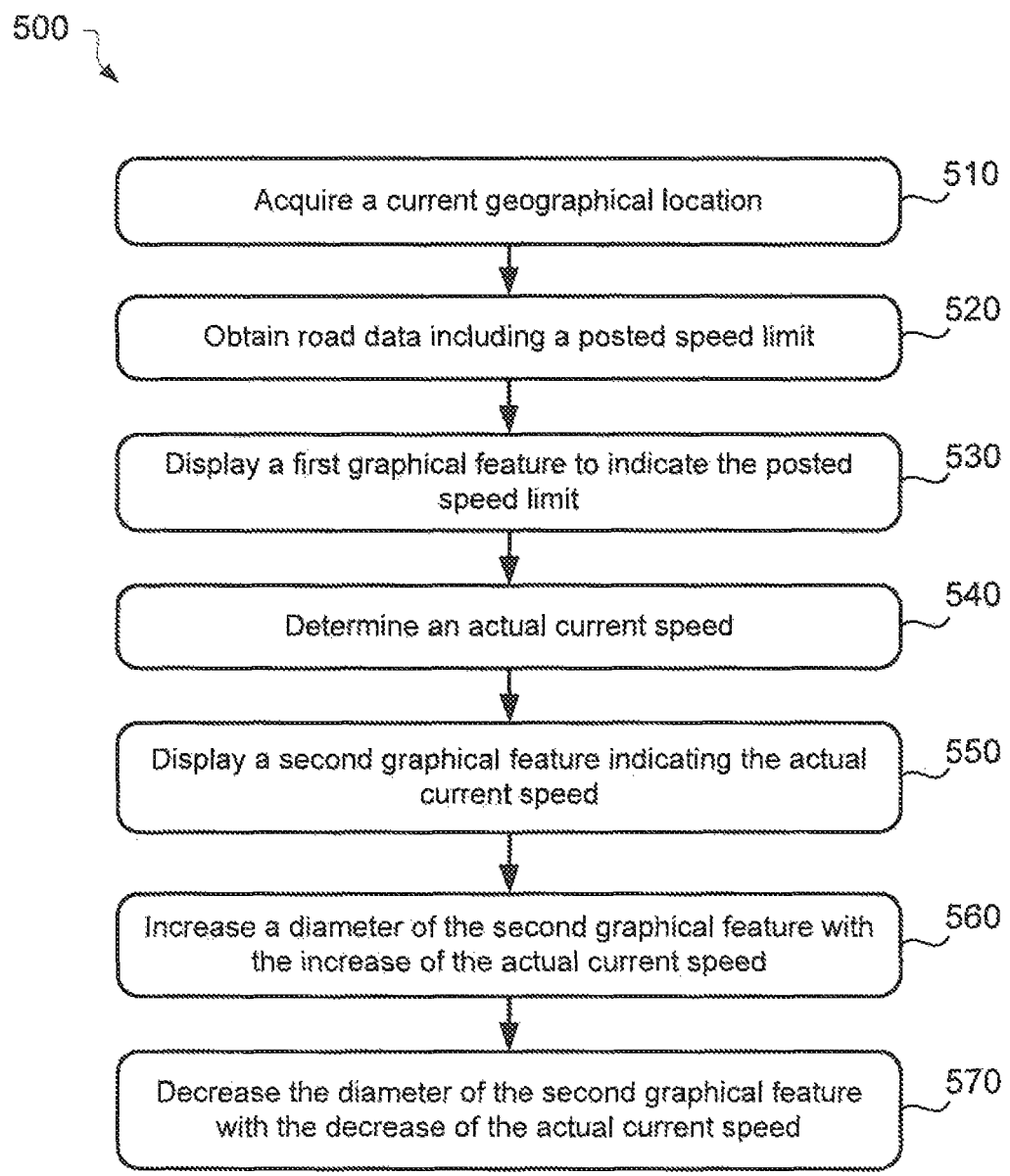
FIG. 5 is a process flow diagram showing a method for displaying speed information.

FIG. 5 is a process flow diagram showing a method 500 for displaying speed information according to an example embodiment. The method 500 may be performed by processing logic that may comprise hardware (e.g., decision-making logic, dedicated logic, programmable logic, ASIC, and microcode), software (such as software run on a general-purpose computer system or a dedicated machine), or a combination of both. In one example embodiment, the processing logic refers to processor 310 or controller 410. Notably, below recited steps of the method 500 may be implemented in an order different than described and shown in the figure. Moreover, the method 500 may have additional steps not shown herein, but which can be evident for those skilled in the art from the present disclosure. The method 500 may also have fewer steps than outlined below and shown in FIG. 5.

The method 500 commences at step 510 with acquiring a current geographical location of a portable electronic device 100 or a vehicle 340. The current geographical location can be acquired by an internal navigation system, remote navigation system, server, cellular base station, and the like.

At step 520, road data is obtained by portable electronic device 100 or vehicle 340 for the current geographical location as determined at step 510. The road data includes a posted speed limit. The road data can be obtained from a server, memory of portable electronic device, memory of vehicle, navigation system, database, and the like.

Figure 7:
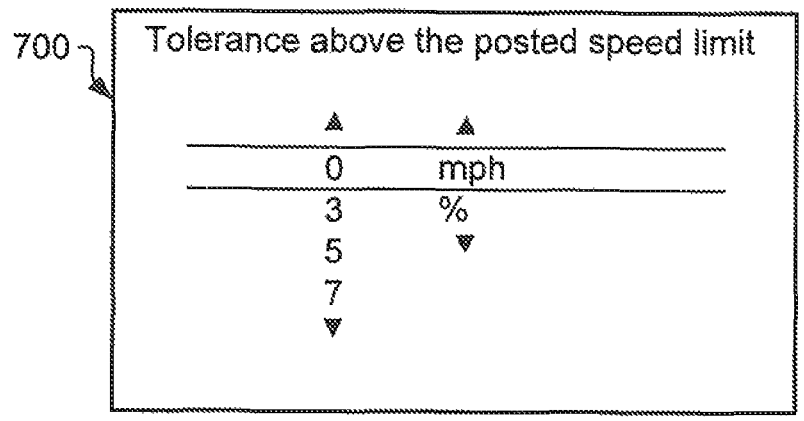
FIG. 7 shows an example graphical user interface enabling an operator to adjust a tolerance value.

In some embodiments, the operator can adjust the posted speed limit by providing a tolerance value. For these ends, the portable electronic device 100 or vehicle 340 can provide a graphical user interface to enable the operator to set the tolerance value associated with the posted speed limit (e.g., the operator can set the tolerance value to a particular numerical value or a percentage value). In that case, the portable electronic device 100 or vehicle 340 adjusts the posted speed limit by the tolerance value. For example, if the tolerance value was set by the operator to be equal to 5 mph, the portable electronic device 100 or vehicle 340 adds to the posted speed limit the tolerance value of 5 mph. In another example, if the tolerance value was set by the operator to be equal to 10%, the portable electronic device 100 or vehicle 340 increase the posted speed limit by the tolerance value of 10%. In some embodiments, the tolerance value can be a negative value, which would lead to the decrease of the posted speed limit. FIG. 7 shows an example GUI 700 enabling the operator to adjust the tolerance value.

Figure 6A:
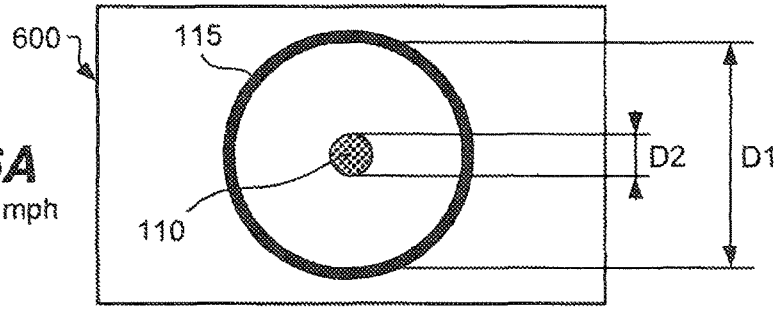
FIGS. 6A-6D show example graphical user interfaces illustrating first and second graphical features and animation of the second graphical feature with the increase of actual current speed.

Referring back to FIG. 5, the method 500 proceeds to step 530 when a first graphical feature 110 is displayed on a display of portable electronic device 100 or vehicle 340 to indicate the posted speed limit (for example, 60 mph). FIG. 6A further shows a GUI 600 with the first graphical feature 110. The GUI 600 can be displayed on a display of portable electronic device 100 or vehicle 340. The first graphical feature 110 can be in the form of a circle or ring. The first graphical feature 110 has a diameter D1.

At step 540, the portable electronic device 100 or vehicle 340 determines an actual current speed of the portable electronic device 100 or the vehicle 340. As discussed above, the actual current speed can be measured by a speedometer, obtained from a navigation system, calculated by a processor, or acquired from one of the servers.

At step 550, the portable electronic device 100 or vehicle 340 causes to display a second graphical feature 115 indicating the actual current speed of the portable electronic device 100 or the vehicle 340. FIG. 6A further illustrates the second graphical feature 115 presented in the form of a circular object (e.g., a circle). The second graphical feature 115 has a diameter D2. The diameter D2 corresponds to the actual current speed. When the actual current speed is zero, the diameter D2 is of a predetermined smallest size.

Figure 6B:
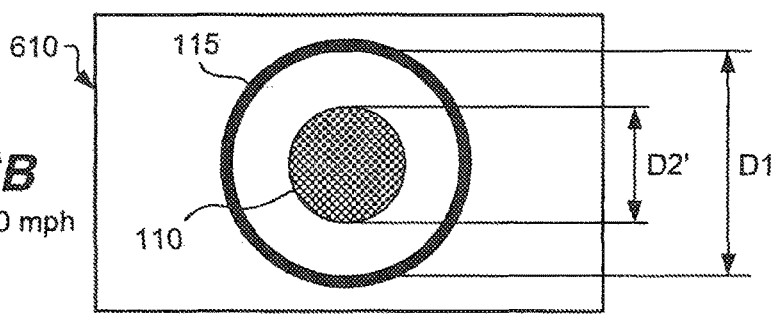
Figure 6C:
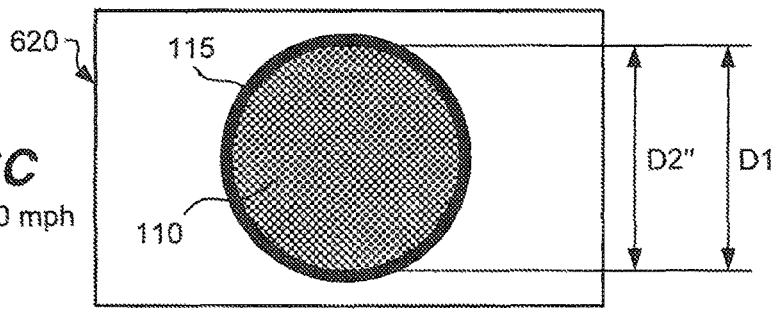
Figure 6D:
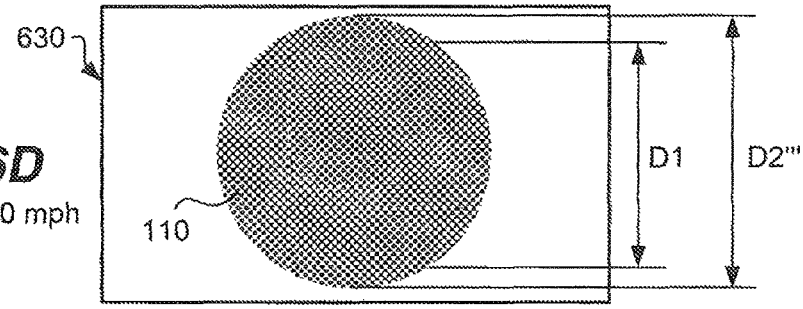

At step 560, the portable electronic device 100 or vehicle 340 increases the diameter D2 of the second graphical feature 115 with the increase of the actual current speed. This process is further shown in FIGS. 6A-6C. For example, FIG. 6B shows a GUI 610 when the actual current speed reached 30 mph. In that instance, the second graphical feature 115 acquires the diameter D2', which is greater than the diameter D2 shown in FIG. 6A. As further illustrated in FIG. 6C, if the actual current speed increases and reaches 60 mph (i.e., it reaches the posted speed limit upon condition that the tolerance value is zero or absent), the second graphical feature 115 acquires the diameter D2", which is greater than the diameter D2 and diameter D2' discussed above. In some embodiments, when the actual current speed reaches the posted speed limit (adjusted by the tolerance value or not), the diameter D2" of the second graphical feature 115 becomes of the same size as the diameter D1 of the first graphical feature 110 (see a GUI 620 of FIG. 6C). If the actual current speed becomes greater than the posted speed limit, the second graphical feature 115 acquires the diameter D2''' (see a GUI 630 of FIG. 6C), which is greater than the diameters D1, D2, D2', and DT". It should be understood, however, that the diameter of second graphical feature 115 can increase up to a predetermined limit.

In some embodiments, the second graphical feature 115 is of a first color (e.g., green). The second graphical feature 115 can become of a second color (e.g., red) when the actual current speed is about the posted speed limit or the actual current speed is above the posted speed limit. The second graphical feature 115 can become of the first color (e.g., green) when the actual current speed is again below the posted speed limit.

Referring back to FIG. 5, the method 500 further includes a step 570 when the portable electronic device 100 or vehicle 340 decreases the diameter D2 of the second graphical feature 115 with the decrease of the actual current speed. The decrease of diameter D2 of the second graphical feature 115 can be performed in an order opposite to an order shown in FIGS. 6A-6D.

Figure 8:
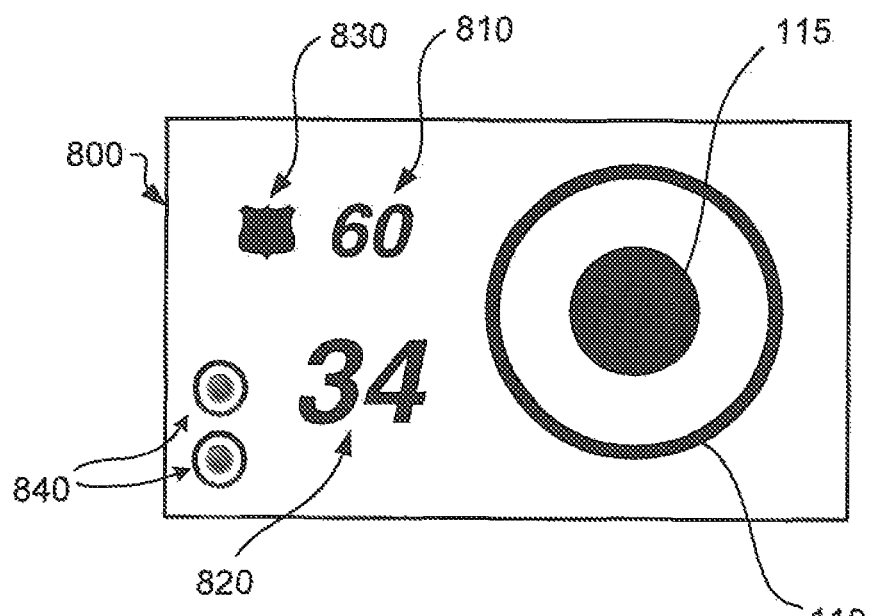
FIG. 8 shows an example graphical user interface for displaying speed data according to certain embodiments of this disclosure.

FIG. 8 shows yet another GUI 800 for displaying speed data, according to various embodiments of this disclosure. Specifically, the GUI 800 includes the first and second graphical features 110, 115 as described above. The GUI 800 further includes a first symbol 810 indicating the posted speed limit. For example, the first symbol 810 is a numerical value of the posted speed limit (e.g., 60 mph).

The GUI 800 optionally includes a second symbol 820 indicating the actual current speed of portable electronic device 100 or vehicle 340. Similar to above, the second symbol 820 can be a numerical value of the actual current speed (e.g., 34 mph as shown in the figure).

The GUI 800 optionally includes a third graphical feature 830 indicating a road type. The road type data can be retrieved from the road data. For example, the third graphical feature 830 can be an image or pictogram of a city, highway, country road, and the like. The third graphical feature 830 helps the operator to apprehend what a speed limit might be in a particular area.

The GUI 800 can optionally include one or more actionable buttons 840. For example, one of the buttons 840 can cause mirroring the displayed speed information such that the GUI 800 can be used in a head-up display device with a combiner. Yet another one of the buttons 840 can enable the operator to adjust settings of the software application. In one embodiment, the operator can adjust colors, language, set a tolerance value, set sound alerts, set units (e.g., miles per hour or kilometers per hour), activate a voice speedometer, activate navigational features, make upgrades, and so forth.

Figure 9:
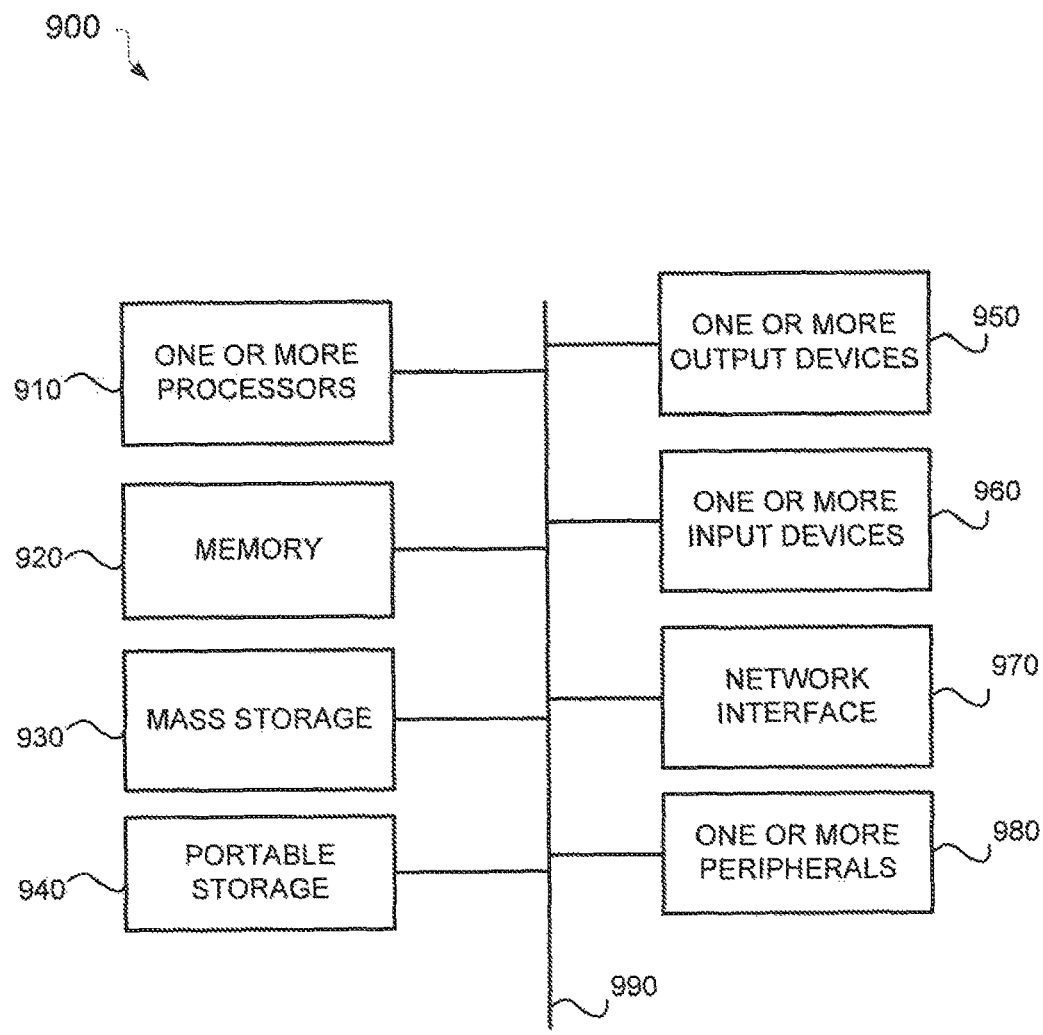
FIG. 9 is a computer system that may be used to implement the methods for displaying speed information.

FIG. 9 illustrates an exemplary computing system 900 that may be used to implement embodiments described herein. System 900 of may be implemented in the contexts of the likes of portable electronic device 100 or in-vehicle controller. The computing system 900 of FIG. 9 may include one or more processors 910 and memory 920. Memory 920 stores, in part, instructions and data for execution by processor 910. Memory 920 can store the executable code when the system 900 is in operation. The system 900 may further include a mass storage device 930, portable storage medium drive(s) 940, one or more output devices 950, one or more input devices 960, a network interface 970, and one or more peripheral devices 980.

The components shown in FIG. 9 are depicted as being connected via a single bus 990. The components may be connected through one or more data transport means. Processor 910 and memory 920 may be connected via a local microprocessor bus, and the mass storage device 930, peripheral device(s) 980, portable storage device 940, and network interface 970 may be connected via one or more input/output (I/O) buses.

Mass storage device 930, which may be implemented with a magnetic disk drive or an optical disk drive, is a non-volatile storage device for storing data and instructions for use by a magnetic disk or an optical disk drive, which in turn may be used by processor 910. Mass storage device 930 can store the system software for implementing embodiments described herein for purposes of loading that software into memory 920.

Portable storage medium drive(s) 940 operates in conjunction with a portable non-volatile storage medium to input and output data and code to and from the computer system 900. The system software for implementing embodiments described herein may be stored on such a portable medium and input to the computer system 900 via the portable storage medium drive(s) 940.

Input devices 960 provide a portion of a user interface. Input devices 960 may include an alphanumeric keypad, such as a keyboard, for inputting alphanumeric and other information, or a pointing device, such as a mouse, a trackball, a stylus, touchscreen, or cursor direction keys. Additionally, the system 900 includes output devices 950. Suitable output devices include speakers and displays.

Network interface 970 can be utilized to communicate with external devices, external computing devices, servers, and networked systems via one or more communications networks such as one or more wired, wireless, or optical networks including, for example, the Internet, intranet, local area network (LAN), wide area network (WAN), cellular phone networks (e.g. Global System for Mobile (GSM) communications network, packet switching communications network, circuit switching communications network), Bluetooth™ radio, and an IEEE 802.11-based radio frequency network, among others.

The components contained in the computer system 900 are those typically found in computer systems that may be suitable for use with embodiments described herein and are intended to represent a broad category of such computer components that are well known in the art. Thus, the computer system 900 can be a personal computer, laptop computer, tablet computer, in-vehicle controller, hand held computing device, telephone, mobile computing device, workstation, server, minicomputer, mainframe computer, navigation system, or any other computing device. The computer can also include different bus configurations, networked platforms, multi-processor platforms, and so forth.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the invention. Those skilled in the art are familiar with instructions, processor(s), and storage media.

It is noteworthy that any hardware platform suitable for performing the processing described herein is suitable for use with the invention. The terms "computer-readable storage medium" and "computer-readable storage media" as used herein refer to any medium or media that participate in providing instructions to a Central Processing Unit (CPU) for execution. Such media can take many forms, including, but not limited to, non-volatile media, volatile media, and transmission media. Non-volatile media include, for example, optical or magnetic disks, such as a fixed disk. Volatile media include dynamic memory, such as system random access memory (RAM). Transmission media include coaxial cables, copper wire, and fiber optics, among others, including the wires that include one embodiment of a bus. Transmission media can also take the form of acoustic or light waves, such as those generated during radio frequency (RF) and infrared (IR) data communications. Common forms of computer-readable media include, but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, HD-DVDs, memory sticks, mini disks, laser disks, Blu-ray disks, flash drives, and other newer types of memories, and certain types of transmission type media such as, for example, digital and analog communication links capable of storing the set of instructions.

Thus, methods and systems for displaying speed information have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A method for displaying speed information, the method comprising:
   acquiring a current geographical location of a portable electronic device or a vehicle;
   obtaining road data for the current geographical location of the portable electronic device or the vehicle, wherein the road data includes a posted speed limit;
   displaying a first graphical feature indicating the posted speed limit, wherein the first graphical feature includes a circular graphical feature;
   determining an actual current speed of the portable electronic device or the vehicle;
   displaying a second graphical feature indicating the actual current speed of the portable electronic device or the vehicle, wherein the second graphical feature has a size that corresponds to the actual current speed, wherein the second graphical feature is centered within the circular graphical feature such that the second graphical feature is located substantially inside the circular graphical feature, wherein the size of the second graphical feature substantially reaches a size of the circular graphical feature when the actual current speed is about the posted speed limit;
   increasing the size of the second graphical feature with an increase of the actual current speed; and
   decreasing the size of the second graphical feature with a decrease of the actual current speed.

2. The method of claim 1, further comprising increasing the size of the second graphical feature greater than the size of the circular graphical feature when the actual current speed increases and is greater than the posted speed limit.

3. The method of claim 1, wherein the second graphical feature is of a first color, and further comprising displaying the second graphical feature of a second color when the actual current speed reaches the posted speed limit, wherein the second color differs from the first color.

4. The method of claim 1, further comprising displaying a first symbol indicating the posted speed limit, wherein the first symbol provides a numerical value of the posted speed limit.

5. The method of claim 1, further comprising displaying a second symbol indicating the actual current speed, wherein the second symbol provides a numerical value of the actual current speed.

6. The method of claim 1, further comprising displaying a third graphical feature indicating a road type, wherein the road type is retrieved from the road data.

7. The method of claim 1, further comprising:
providing a graphical user interface to enable an operator to set a tolerance value associated with the posted speed limit; and increasing the posted speed limit by the tolerance value.

8. An in-vehicle system for displaying speed information, the system comprising:
a speed measuring device configured to measure an actual current speed of a vehicle;
a display for displaying speed information to an operator of the vehicle; and
a controller configured to:
acquire a current geographical location of the vehicle;
obtain road data for the current geographical location of the portable
electronic device or the vehicle, wherein the road data includes a posted speed limit;
cause the display to display a first graphical feature indicating the posted speed limit, wherein the first graphical feature includes a circular graphical feature;
cause the display to display a second graphical feature indicating the actual current speed of the portable electronic device or the vehicle, wherein the second graphical feature has a size that corresponds to the actual current speed, wherein the second graphical feature is centered within the circular graphical feature such that the second graphical feature is located substantially inside the circular graphical feature, wherein the size of the second graphical feature substantially reaches a size of the circular graphical feature when the actual current speed is about the posted speed limit;
increase the size of the second graphical feature with the increase of the actual current speed; and
decrease the size of the second graphical feature with the decrease of the actual current speed.

9. The system of claim 8, wherein the controller is further configured to acquire the current geographical location from a navigation system.

10. The system of claim 8, wherein the controller is further configured to acquire the current geographical location from a portable electronic device.

11. The system of claim 8, wherein the controller is configured to obtain the road data for the current geographical location from a server and a memory associated with the controller.

12. The system of claim 8, wherein the controller is configured to increase the size of the second graphical feature greater than the size of the circular graphical feature when the actual current speed increases and is greater than the posted speed limit.

13. The system of claim 8, wherein the controller is configured to:
cause the display to display a first symbol indicating the posted speed limit, wherein the first symbol provides a numerical value of the posted speed limit; and cause the display to display a second symbol indicating the actual current speed, wherein the second symbol provides a numerical value of the actual current speed.

14. The system of claim 8, wherein the controller is configured to display a third graphical feature indicating a road type, wherein the road type is retrieved from the road data.

15. The system of claim 8, further comprising a user interface to enable the operator of the vehicle to set a tolerance value associated with the posted speed limit, wherein the controller is further configured to increase the posted speed limit by the tolerance value.

16. A non-transitory processor-readable medium having instructions stored thereon, which when executed by one or more processors, cause the one or more processors to implement a method for displaying speed information, the method comprising:
acquiring a current geographical location of a portable electronic device or a vehicle;
obtaining road data for the current geographical location of the portable electronic device or the vehicle, wherein the road data includes a posted speed limit;
displaying a first graphical feature indicating the posted speed limit, wherein the first graphical feature includes a circular graphical feature;
determining an actual current speed of the portable electronic device or the vehicle;
displaying a second graphical feature indicating the actual current speed of the portable electronic device or the vehicle, wherein the second graphical feature has a size that corresponds to the actual current speed, wherein the second graphical feature is centered within the circular graphical feature such that the second graphical feature is located substantially inside the circular graphical feature, wherein the size of the second graphical feature substantially reaches a size of the circular graphical feature when the actual current speed is about the posted speed limit;
increasing the size of the second graphical feature with the increase of the actual current speed; and
decreasing the size of the second graphical feature with the decrease of the actual current speed.

* * * * *